(12) United States Patent
Lam

(10) Patent No.: US 12,554,560 B2
(45) Date of Patent: Feb. 17, 2026

(54) FIRMWARE EVENT STACK ROUTING

(71) Applicant: BAE Systems Information and Electronic Systems Integration Inc., Nashua, NH (US)

(72) Inventor: Mei I. Lam, Austin, TX (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 547 days.

(21) Appl. No.: 18/319,201

(22) Filed: May 17, 2023

(65) Prior Publication Data
US 2024/0385910 A1    Nov. 21, 2024

(51) Int. Cl.
 *G06F 9/54* (2006.01)
 *G06F 8/41* (2018.01)
 *G06F 16/27* (2019.01)

(52) U.S. Cl.
 CPC .............. *G06F 9/542* (2013.01); *G06F 8/441* (2013.01); *G06F 16/27* (2019.01)

(58) Field of Classification Search
 None
 See application file for complete search history.

(56) References Cited

U.S. PATENT DOCUMENTS

| | | | |
|---|---|---|---|
| 6,134,676 A | 10/2000 | VanHuben et al. | |
| 7,200,745 B2 | 4/2007 | Schwartz, Jr. et al. | |
| 7,284,083 B2 | 10/2007 | Oshins et al. | |
| 7,844,945 B2 | 11/2010 | Bhagia et al. | |
| 7,873,770 B2 | 1/2011 | Hummel et al. | |
| 9,092,366 B2* | 7/2015 | King | G06F 12/1081 |
| 9,122,413 B2 | 9/2015 | Bakke et al. | |
| 9,383,931 B2 | 7/2016 | Craddock et al. | |
| 9,626,232 B2 | 4/2017 | Verplanken | |
| 10,599,595 B2 | 3/2020 | Hindle et al. | |
| 10,997,100 B2 | 5/2021 | Hindle et al. | |
| 11,429,546 B2 | 8/2022 | Hindle et al. | |
| 2003/0065853 A1* | 4/2003 | Lary | H04L 67/10 710/260 |
| 2005/0060525 A1 | 3/2005 | Schwartz et al. | |
| 2008/0109564 A1* | 5/2008 | Arndt | G06F 13/24 710/3 |
| 2021/0207835 A1* | 7/2021 | Ho | F24F 11/61 |
| 2021/0286553 A1* | 9/2021 | Moiseyenko | G06F 11/302 |
| 2022/0291947 A1 | 9/2022 | Alaparthi et al. | |
| 2024/0152289 A1* | 5/2024 | Yoo | G06F 3/0656 |
| 2024/0395129 A1* | 11/2024 | Wolf | G08B 29/185 |

* cited by examiner

*Primary Examiner* — Charles E Anya
(74) *Attorney, Agent, or Firm* — Sand, Sebolt & Wernow LPA

(57) ABSTRACT

A computer firmware product improves computer processing efficiency by implementing a process to replicate at least one field index in multiple register destinations. A translation table contains data in a plurality of fields and a plurality of register destination addresses for a firmware event. The firmware product pushes data associated with one field to at least two different register destination addresses. The firmware product recompiles the translation table with the updated data pushed from one field to the two different register destination addresses. Then, the firmware product performs a function based on the translation table with the updated data pushed from the one field to the two different register destination addresses by solely changing the translation table.

18 Claims, 2 Drawing Sheets

FIRMWARE EVENT STACK ROUTING

TECHNICAL FIELD

The present disclosure relates to processing events in firmware.

BACKGROUND ART

There are several types of processing events in firmware that require communication of data and/or fields to registers. For example, there are interrupts, timers, DMA transfers, and Communication Protocols.

With respect to interrupts, these are events generated by hardware devices that require immediate attention from the firmware. The data associated with the interrupt is communicated through interrupt handlers, which typically save the context of the processor, fetch and process the data, and restore the context.

With respect to timers, these are events generated by hardware timers that trigger at regular intervals. The timer data is communicated through timer interrupts or polling routines, which retrieve and update the timer value in a register.

With respect to DMA transfers, these are events in which data is transferred between the memory and a peripheral device using direct memory access (DMA). The data is communicated through DMA registers, which configure the transfer and receive status information from the peripheral device.

With respect to communication protocols, these are events in which firmware communicates with other devices or systems using communication protocols such as SPI, I2C, UART, and USB. The data is communicated through protocol-specific registers or buffers, which store the data according to the protocol specifications.

To efficiently and flexibly communicate the data and/or fields within an event to the registers that need that data, firmware can use the following techniques: Direct memory access (DMA), Interrupt-driven processing, Polling, and Interrupt chaining.

With respect to DMA, this technique allows firmware to transfer data between memory and devices without involving the processor, thereby reducing the processing overhead for data transfer. However, DMA is not without drawbacks. DMA is sometimes prone to: security risks inasmuch as DMA bypasses the CPU, attackers can perform malicious activities in the system without being noticed by the operating system; compatibility Issues inasmuch as DMA relies heavily on the compatibility between the devices used. If the two devices involved in the transfer do not support the same DMA type, it may cause issues when implementing DMA; resource constraints inasmuch as DMA requires hardware resources to function. If a system does not have enough resources, DMA may not be an optimal solution; limited accessibility inasmuch as DMA also limits accessibility to the memory. It can only be accessed by the devices associated with DMA, which can make sharing data between different devices challenging; and complexity inasmuch as DMA requires significant setup and configuration. This can make it a challenging technique to implement, particularly for less experienced developers.

With respect to interrupt-driven processing, this technique allows firmware to handle interrupts in a timely manner by temporarily interrupting the normal execution flow and processing the data associated with the interrupt. However, interrupt-driven processing is not without drawbacks. Interrupt-driven processing is sometimes prone to: increased complexity inasmuch as Interrupt-driven processing requires additional hardware and software mechanisms to manage the interrupts, which can add complexity to the system; overhead inasmuch as interrupt processing requires that the system context is stored and restored, which can introduce additional overhead; delayed response times inasmuch as the time delay between an interrupt occurring and its handling can lead to delayed response times, which can impact real-time systems; priority conflicts inasmuch as interrupts are often prioritized, and conflicts can arise when multiple interrupts occur simultaneously; synchronization issues inasmuch as interrupts can cause synchronization issues when they occur during critical sections of code, leading to inconsistent data or system behavior; debugging challenges inasmuch as debugging interrupt-driven systems can be challenging because the timing of the interrupts may not be predictable; and limited throughput inasmuch as interrupt-driven processing may not be suitable for high-throughput systems, as the overhead of processing interrupts can limit the overall processing speed.

With respect to polling, this technique involves periodically checking the status of register flags or other indicators to determine whether an event has occurred, and processing the associated data accordingly. However, polling is not without drawbacks. Polling is sometimes prone to: a limited sample size inasmuch as polls are conducted using a sample group that is intended to represent a larger group. However, it may be difficult to obtain a sample that accurately represents the larger population. As a result, there is a risk that the results of the poll may not be a true reflection of the larger population.

With respect to interrupt chaining, this technique involves linking multiple interrupt service routines (ISRs) together, allowing firmware to efficiently handle multiple related events in a single ISR. However, interrupt chaining is not without drawbacks. Interrupt chaining is sometimes prone to performance overhead inasmuch as the interrupt chaining technique can add significant overhead to the system's performance due to the number of interrupts it has to handle. With each interrupt handled by a separate handler, the system may become less efficient, leading to slower response times; complexity inasmuch as the interrupt chaining technique can increase the complexity of the system. With each interrupt having its own handler, it can be difficult to keep track of what each handler is doing, making it harder to debug and maintain the system; unpredictability inasmuch as each interrupt handler may potentially chain to another handler, the order in which the system processes interrupts may become unpredictable. This can lead to unexpected and hard-to-debug behavior; difficulty in prioritization inasmuch as prioritizing interrupts can be difficult with interrupt chaining. With each interrupt potentially chaining to another interrupt, it can be difficult to decide which interrupt needs to be handled first, leading to longer response times; and resource constraints inasmuch as the interrupt chaining technique may consume more resources, such as memory and processor time, to support the chain of interrupt handlers. This may also limit the number of interrupts the system can handle simultaneously.

Overall, the choice of technique depends on the specific requirements of the event and the system, including the available processing resources, the data transfer rate, and the latency requirements. By using efficient and flexible communication techniques, firmware can process events at speed and improve system performance.

SUMMARY OF THE INVENTION

When processing events at speed in firmware, there is needed a more efficient and flexible way to communicate the data/fields within an event to the registers that need that data in a timely manner. The present disclosure utilizes a design of a translation table to allow for flexible mapping of the fields in the event to the desired location where the data will be used for processing. Any high speed embedded system can utilize this design for its event processing.

The present disclosure addresses the previously mentioned computer processing pitfalls and enables a firmware product to run more efficiently and quickly, thereby improving overall computing, processing and speed by eliminating the drawbacks of the previous firmware techniques by providing a translation table in the firmware that enables the pushing one field in an event queue to at least two different register locations. In one exemplary aspect, the present disclosure improves this computer functionality over that which is currently available by providing a translation table in the firmware that enables pushing one field to multiple register destinations. Through the use of the translation table that pushes one field in an event to multiple register destination, the present disclosure improves computer functionality over the previous techniques that only push one field to one register destination. The manner in which the present disclosure teaches improves computer functionality by providing greater processing flexibility. Thus, some aspects of the present disclosure may improve computer functionality, thus improving upon a computer centric problem to increase processing capabilities that would be ordinarily unavailable based on current computer processing techniques. Thus, the present disclosure is able to provide a greater practical application of firmware products to provide greater capabilities than were previous available. Thus, stated otherwise, while previous firmware could process fields in an event, the system of the present disclosure is able to perform a similar function in an improved way that increases or advances computer processing design capabilities. For example, the computer centric problem of limited firmware processing capability based on limited or serial field processing are all reduced by providing a new and improved firmware processing technique, configuration or method of providing a translation table to simultaneously pushing one field to at least two different register destinations.

In yet another aspect, one other exemplary embodiment of the present disclosure may provide a computer firmware product for improving computer processing efficiency, the computer firmware product operable with at least one non-transitory computer readable storage medium in operative communication with a computer processing unit (CPU), the storage medium having instructions stored thereon that, when executed by the CPU, implement a process to replicate at least one field index in multiple register destinations, the process comprising: providing a translation table containing data in a plurality of fields and a plurality of register destination addresses for a firmware event; pushing data associated with one field to at least two different register destination addresses; recompiling the translation table with updated data pushed from one field to at least two different register destination addresses; and performing a function in firmware based on the translation table with updated data pushed from the one field to the at least the two different register destination addresses by solely changing the translation table.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
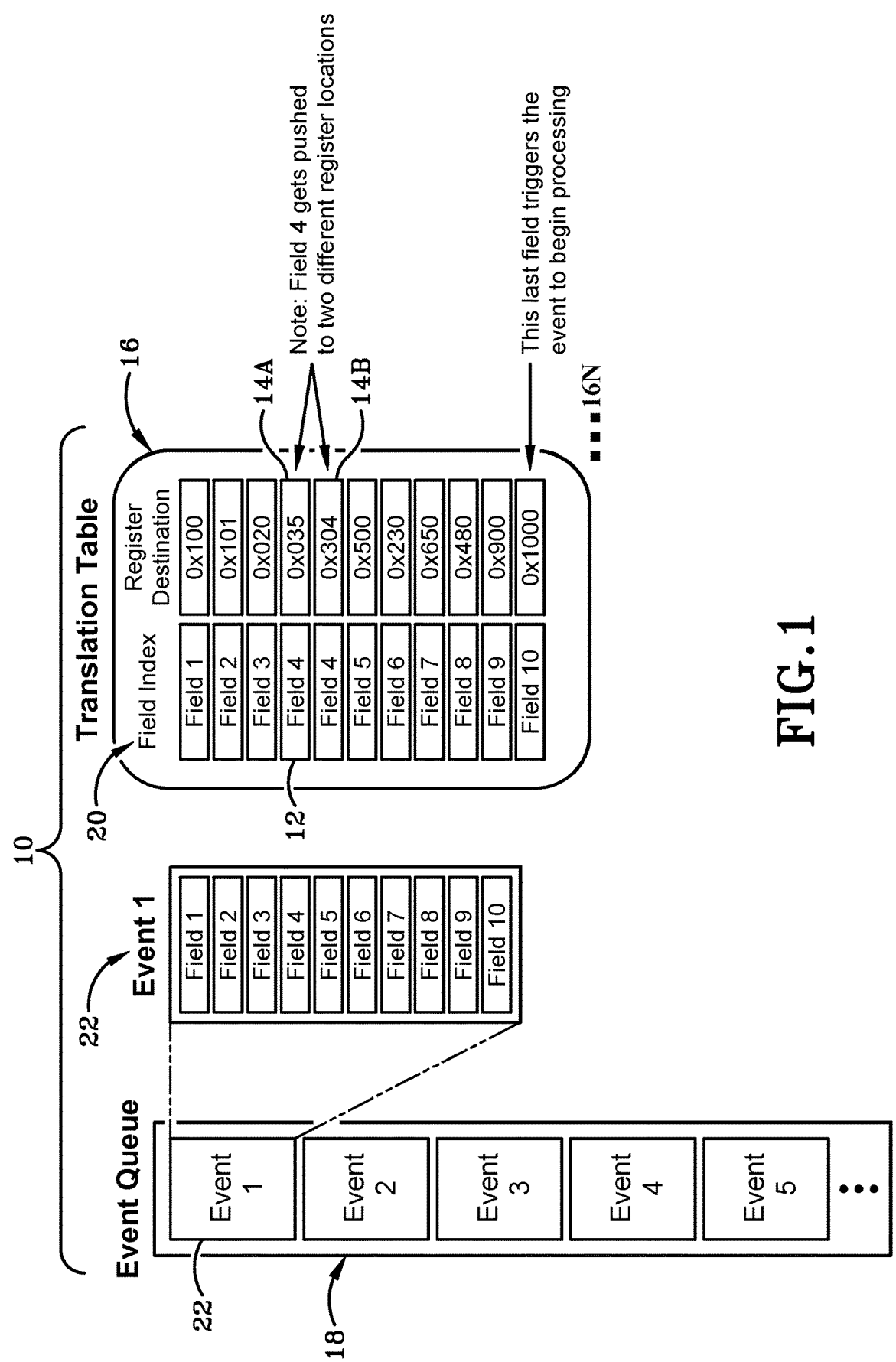
FIG. 1 is a schematic view of an exemplary computer firmware product according to an exemplary embodiment of the present disclosure.

Firmware is a type of software that is embedded in hardware devices such as microcontrollers, sensors, and other smart devices. It is responsible for controlling the device's hardware operations and processes data according to the device's intended function. To effectively process data, firmware relies on multiple event queues that ensure seamless operations and prevent data loss. Each event in the event queue is made up of multiple fields that enable the firmware to process data in a structured manner.

Event queues are used to manage and prioritize events generated by the device's hardware and software components. An event is an occurrence of an action or an input such as pressing a button, receiving a signal, or transmitting data. Firmware receives these events and some firmware processes them in the order they are received in the event queue. For instance, if a user presses a button on a device, the event is added to the event queue and may be processed in the order it was received. Multiple events can be processed simultaneously by the firmware, provided that they are queued correctly.

Some firmware utilizes multiple events in an event queue to process data effectively. Each event in the event queue is dedicated to handling a specific type of event or a particular operation that needs to be performed. For example, there may be an event queue for sensor readings, a queue for user input events, and another queue for performing tasks such as logging data or sending data to another device. Each event queue can have a different priority level, which allows the firmware to process high-priority events first.

Each event in the event queue is made up of multiple fields that provide relevant data about the event. The fields provide information about the event type, when the event was generated, and the data associated with the event. Firmware uses this information to process the event effectively. The fields in the event queue vary depending on the type of event or operation being performed. For example, an event queue handling sensor data may have fields such as sensor ID, timestamp, and sensor value. On the other hand, an event queue handling user input may have fields such as the button ID, timestamp, and action performed.

Event queues allow firmware to schedule tasks based on the priority level of events in the queue. For example, if a high-priority event is received, it is immediately queued and processed before other lower priority events. This ensures that critical tasks are executed quickly and effectively. Firmware can also prioritize tasks based on the device's operating conditions. For example, a firmware can prioritize tasks that help conserve power when the device is running on low battery.

Some firmware processes data in the event queue using a set of predefined rules and algorithms. For instance, if the data in the event queue is destined for a particular hardware component, firmware processes the data according to the communication protocol used by the hardware. The firmware can also process data from multiple event queues simultaneously. For example, if a device is receiving real-time data from multiple sensors, firmware can process the data from each sensor simultaneously, provided that there are no hardware constraints.

Firmware ensures that each event is handled accurately by performing validation checks and ensuring that the event is appropriate for the device's operations. For example, if the event is related to user input, the firmware performs checks to ensure that the input is valid and does not cause any unexpected behavior. Similarly, firmware may perform checks to ensure that the event is not already in the event queue, which could cause data loss or conflicts. Firmware must ensure that all events are handled correctly to ensure that the device is operating as expected.

Firmware can use event queues to handle interrupts, or unexpected events that occur during device operations. For example, if the device detects a hardware fault, the firmware can immediately add an interrupt event to the event queue, which can be processed before other events. This ensures that the device remains operational and that data collection is not affected. An event queue dedicated to handling device interrupts can provide firmware with a quick and effective way to manage unexpected events.

Firmware can use event queues to log data, which can be used later for analysis or diagnostic purposes. For example, if a device is collecting data from multiple sensors, the firmware can log the data in an event queue dedicated to storing sensor data. This allows firmware to track device performance and make informed decisions about device maintenance, diagnostic testing, or data analysis. The data in the event queue can be stored locally or transferred to another device or server for further processing.

Firmware can use event queues to manage device communication effectively. The queue can handle events such as data transmission and receipt, ensuring that data is transferred accurately and reliably. The queue can also prioritize data transmission events based on the nature of the operation. For example, if critical data needs to be transmitted, the firmware can prioritize this operation over less urgent data transmission events. This ensures that important data is transmitted without delay, reducing the risk of data loss or data corruption.

Fields in the event are typically pushed to a register destination through a process called event handling or event processing. In firmware, a register destination refers to a location in memory that holds data or information that is used by the processor or microcontroller. It is a specific memory location that can be accessed by the firmware program to store or retrieve data.

Registers are the smallest memory locations in a processor or microcontroller, and they are used to hold temporary data, program instructions, and other important system information. There are different types of registers that are used for specific purposes, such as general-purpose registers, program counters, and stack pointers.

The register destination in firmware is typically used to store the result of an operation that the processor or microcontroller performs. For example, if a firmware program is performing a calculation, it may use a register destination to store the result of the calculation before moving on to the next operation.

In some instances, the register destination is specified by the programmer using assembly language instructions. These instructions typically, although not necessarily, include a register name or number, which specifies the register that should be used as the destination for the operation.

This process of pushing fields to a register destination involves several steps. For example, the event queue receives an event, which may be triggered by some action, such as a user input, a system event, or a timer signal. The event queue identifies the type of event and its associated data or parameters, which may be stored as fields or variables. The event queue determines the destination or recipients for the event, which may include one or more event handlers or subscribers. The event queue pushes the event and its data to each recipient in turn, using a communication channel such as a message queue or a callback function. Each recipient processes the event and its data, typically by executing some code or function that responds to the event. During processing, the recipient may store the event data or parameters in one or more registers, which are typically fast-access memory locations within the processor or hardware system. Once the processing is complete, the recipient may send a response or acknowledgement back to the event queue, indicating that the event has been handled.

The process of pushing fields in the event queue to a register destination involves a complex series of steps that require careful coordination and management to ensure that events are handled correctly and efficiently.

FIG. 1 depicts, according to one exemplary aspect of the present disclosure, a firmware product 10 that pushes at least one field 12 to at least two different register locations 14A, 14B, rather than just a single register location. This is accomplished through the use of a translation table 16. The ability to push one of the event fields 12 into more than one register or more than one register location demonstrates that the translation table 16 is not limited to a one-to-one constraint. If firmware requires a specific event field in multiple registers to perform its core functionality, no changes to the event message nor software is needed. Only the addition of an extra row in the translation table 16. If one of the registers already being targeted requires a different event field value, no changes are needed in software or firmware—just an adjustment to the translation table 16.

Accordingly, one exemplary aspect of the present disclosure enables an event stack routing scheme or technique of the event queue 18 of the firmware 10 to perform or act as a very light Application Program Interface (API) layer between software and firmware, similar to a "messaging" layer or "middleware" layer. Software can be changed to the point where a user can completely reorder all the fields in the event and the firmware can remain untouched. Conversely, the firmware 10 can be modified to the point where, as long as no additional new fields are needed in the event, the software does not need to be changed. The present disclosure solves this problem and enables that only the translation table 16 needs to be adjusted, which results in a more efficient solution to a computer centric problem and is a practical application of solving this problem.

If there is a field in the event that software provides, but firmware does not need any longer, the Event Stack Routing scheme or technique of the present disclosure may remove the row from the translation table 16 and no additional changes are needed in software. If there is a field in the event that software provides (once), but firmware needs in multiple registers, the Event Stack Routing scheme or technique of the present disclosure may add a row to the translation table 16 with a duplicate Field Index 20 and a new Register Destination and no additional software changes are needed. By performing these actions without the need for additional software changes, the Event Stack Routing scheme or technique of firmware 10 of the present disclosure is able to overcome previous computer-centric deficiencies.

Traditionally, firmware incudes a plurality of registers that contain information that the firmware needs to process an event or process an action. This is typically done in a manual-like process. It normally occurs either in the software or another interface that is communicating with the firmware that needs to populate the registers with a correct value. There is a trigger register or an interrupt that is executed to perform the desired function. During the functionality being performed, the firmware will read the various registers that it needs to accomplish the functionality. However, the present disclosure improves on this technique by providing an improved way to obtain the data or information into the registers necessary to perform the functionality.

The problem typically associated with conventional firmware is that there are events that are transmitted to the firmware. The transmission to the firmware is typically accomplished via a software application that is in communication with an interface to the firmware. In one particular embodiment, the interface is a bare-metal interface. The term bare-metal refers to an interface that is running on the chip itself and there is no operating system. A bare-metal interface or circuit refers to a system that runs without an operating system or other intermediary software layer. In such a system, the bare-metal software is typically programmed directly onto the flash memory of the device. Flash memory is a type of non-volatile memory that can retain data even when power is removed. The process of programming software onto flash memory involves several steps. First, the software is compiled into machine code that can be executed by the bare-metal interface or circuit. Next, the machine code is written to the flash memory using a special programming tool or device programmer. This process involves sending a series of commands to the flash memory that write the machine code to specific memory locations. Once the software is programmed onto the flash memory, it can be executed by the bare-metal interface or circuit. When the device is powered on, it will boot directly into the software stored in the flash memory, without the need for an operating system or other software layer.

Some events that are sent or transmitted to the firmware are time sensitive. These events have any number of fields associated with the event. In one exemplary embodiment, one event 22 has ten fields. However, the number of field does not need to equal ten and there may be any number of fields associated with an event. The number of fields may vary depending on the amount needed to process the event. The traditional approach is to manually populate the fields in order to process the event. However, the system or firmware 10 architecture of the present disclosure package different events and each event has number of fields and each field needs to be transmitted to a register for the firmware to properly perform its functionality. Thus, the present disclosure is able to extract a layer of manual data input by packaging the fields in the correct register via a translation table.

The translation table 16 may be housed on the flash memory on the bare-metal interface or bare-metal circuit. The translation table 16 can be updated without modifying the bare-metal software or firmware or the bare-metal application if a change in where the register destinations are located is needed. The translation table 16 can duplicate the fields from one of the other events such as event one or the first event. In this particular shown example, the field index is duplicated but the fourth field (i.e., field 12) is also duplicated.

The translation table 16 is set up in such a way that firmware can quickly run through all the event fields and push those event data values into the appropriate registers in a very fast manner. Meaning the translation table 16 is set up with an efficient firmware/architecture design so that barely any overhead or power is needed for the actual event processing once the translation table 16 is configured and set up. This allows for very quick event processing during run time. Although the translation table 16 must be configured during initialization, once the translation table is configured and initialize, there are only N extra steps needed per event where N is the number of rows in the translation table, which significantly reduces processing time compared to having to perform a software update or total firmware update.

For example, if a system designer wants to make a change in the firmware 10, and firmware only, then field four (i.e., field 12) or another field needs to be in two different registered destinations 14A, 14B. This allows the firmware 10 to perform two different actions with the values of information from field four at two different register destinations. This allows the bare-metal application to remain the same, the software to remain the same. All that is needed to be done if to change the translation table in the firmware.

With continued reference to this example, one reason why a field 12, such as field four must be in two different registers 14A, 14B, is most likely triggered because there is an update in the firmware to perform a second function with that value. Thus, the source of the requirement for the change is based on or is performed in response to an updated or new function needed in the firmware. The need to change the firmware 10 can be accomplished by updating or altering or otherwise changing the translation table 16 to create a duplicate field entry for another register destination 14B in the translation table 16 without having to change the software. Without this translation table 16 mechanism, software and firmware would need to be changed as is commonly known in the art. This is because if there was no translation table, then the software would need to know where the register destinations are located and it would be the software that would be the component that manually copies that information into those registers. By using the translation table 16 of the present disclosure, the techniques provided herein are able to overcome the previous computer centric problems or needs associated with this software deficiency.

In the example shown of FIG. 1, each register destination may have an address associated with it. The duplicated fourth field 12 may transmit its information to two different addresses or registers 14A, 14B. One register 14A address is represented by "0X035" and another register 14B address is represented by "0X304". These are exemplary register addresses that are different, but both utilize the fourth field 12 information. Thus, the translation table 16 enables information to be duplicated at different register destinations. In this example, if the value in the register needs to be modified during the processing of an event, such as the start time of the event, start time could be placed into the register destination associated with field four at address "0X035" (i.e., register 14A) and the register address identified at "0X304" (i.e., register 14B). Then, if for example a computation of the firmware 10 needs to add a delta or an offset to the start time, then this information can be changed in the register leaving the other start time untouched. For example, if a delayed offset is need, this delayed offset could be added to the register destination associated with field four at the register address of "0X304" while remaining the previous field four address register destination of "0X035" untouched.

The final field, such as the tenth field, however it may be any number of the ultimate field, will trigger the event to begin processing.

In one particular embodiment, the translation table 16 may be a configuration file (config file) or an xml file. Regardless of what type of file the translation table 16 is housed, the file of the translation table 16 allows a system designer or analyst to edit the translation table 16 without having to change software or change firmware in order to change behavior in the system. With this translation table 16, the firmware 10 performs a setup to acknowledge that there is a translation table. The firmware will set it up that for each event about to be processed the firmware will go through the translation table and look at the field index. Whatever the first field is, that field is pushed to that register destination. The second field is pushed to the second register destination. The third field is pushed to the third register destination and so on. As long as the translation table is set up in a linear or serial manner, the translation table 16 is able to be modified outside of having to change the software or the firmware or having to reconfigured the config or xml file.

Further, the numbers associated with the fields are not intended to be limiting. Although they are shown sequentially, it is possible for fields to be arranged in any numerical order. For example, the eighth field or field eight could be placed first in the field index if desired for application specific needs, except for the last field which is typically the triggering field. Although, it is possible for the triggering field to not occur last this may not be desirable for the computational processing.

In one particular embodiment, the translation table 16 is applicable to each of the events in the event queue. However, it is possible to have multiple translation tables 16N. For example, there could be two translation tables, wherein a first translation table is applicable to the odd numbered events 22 and a second translation table is applicable to the even numbered events 22. Further, alternatively, it is possible for there to be an equal number of translation tables that are different that equal the number events however, this may increase processing complexities.

The translation table 16 is fully flexible and allows for different fields to be multiplied or replicated as necessary. Thus, while the example shows that field four is duplicated, it is possible for any filed to be replicated any number of times. For example, the second field could be triplicated, or the eighth field could be quadrupled, or any other increment of replication for a given field could be performed to accomplish the application specific needs of the functionality described herein.

Traditional firmware takes a significant amount of time to compile. Typically, every time there is a firmware build, it takes about four to five hours. Software on the other hand is much faster. It normally takes software about five to ten minutes to complete a build. The present disclosure solves a way to change some of the field to register address movement. Stated otherwise, the present disclosure provides the ability move data to the correct register without having to recompile the firmware every time. Utilizing the techniques of the present disclosure, the firmware 10 does not need to change. All that is needed is to edit the translation table 16, which is a singular configuration table file. Then, the firmware 10 will use this edited translation table 16 in the form of a configuration file and be able to accomplish the translation necessary for each event 22. In this way, a new compile configuration can be accomplished by the software for the fields that need changed. So long as the translation table 16 is updated properly, the firmware does not need to change. This greatly speeds up integration and solves the computer centric problem associated with the four to five hour compile time for changing firmware. Thus, the present disclosure overcomes a very specific computer centric bottleneck problem for processing speed.

Figure 2:
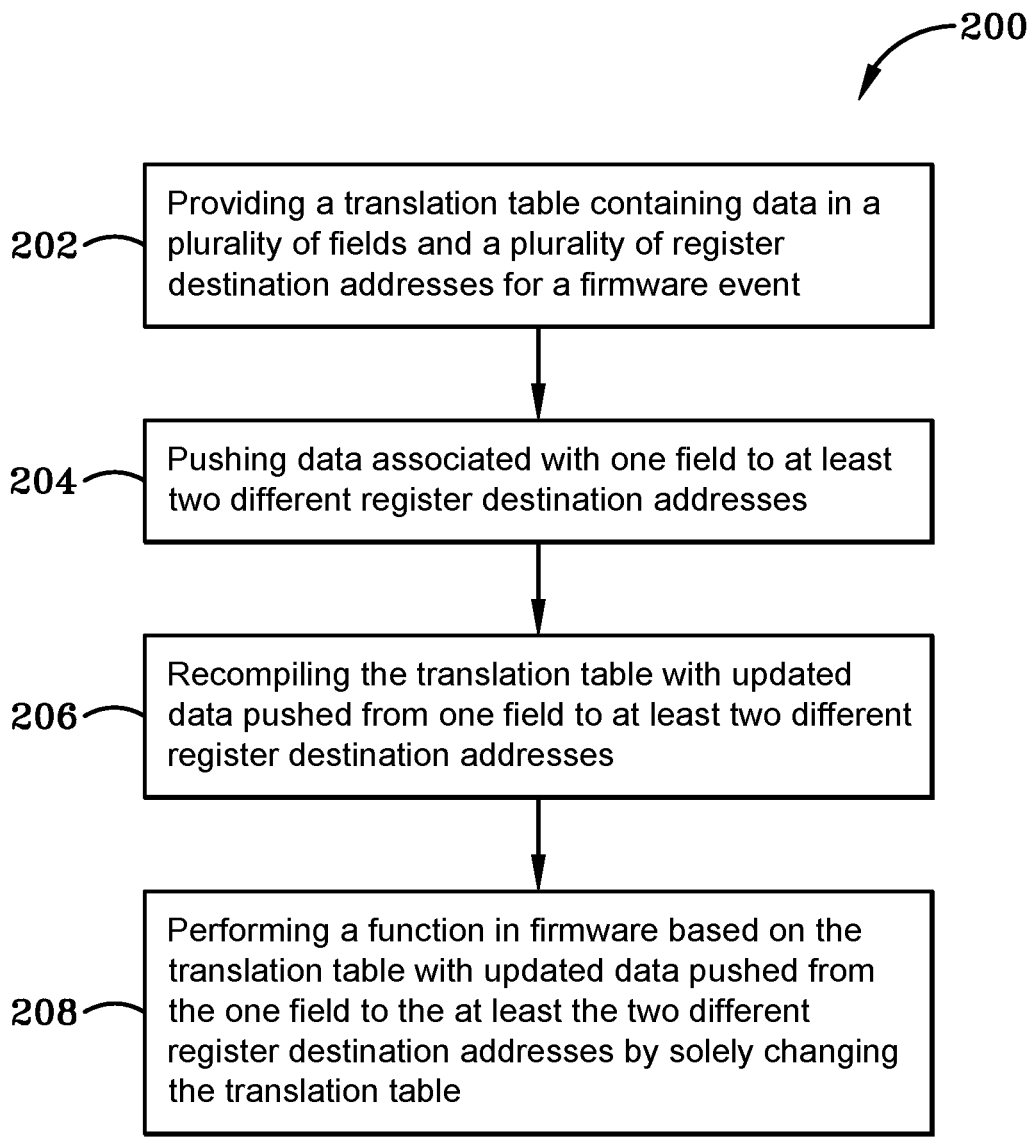
FIG. 2 is a flowchart depicting an exemplary method according to an exemplary embodiment of the present disclosure.

For example, FIG. 2 (in addition to FIG. 1) depicts a computer implemented method generally at 200. The computer implemented method 200 may comprise providing the translation table 16 containing data in a plurality of fields or field index 20 and a plurality of register destination addresses for a firmware event, which is shown generally at 202. Method 200 may include pushing data associated with one field 12 to at least two different register destination addresses 14A, 14B, which is shown generally at 204. Method 200 may include recompiling the translation table 16 with updated data pushed from one field 12 to at least two different register destination addresses 14A, 14B, which is shown generally at 206. Method 200 may include performing a function in firmware based on the translation table 16 with updated data pushed from the one field 12 to the at least the two different register destination addresses 14A, 14B by solely changing the translation table 16, which is shown generally at 208.

By way of example for a practical application of method 200, there may be a smart thermostat that can be controlled remotely through a mobile app. The smart thermostat has various sensors that measure temperature, humidity, and other environmental factors, and based on this data, it adjusts the heating and cooling to maintain a comfortable temperature. To achieve this functionality, the smart thermostat relies on firmware that runs on a microcontroller. The firmware reads data from the sensors, processes it, and sends commands to the HVAC system to adjust the temperature. The firmware also communicates with the mobile app to receive user inputs and update the thermostat settings. To implement the computer implemented method 200, consider a specific firmware function that involves updating the temperature set point based on user inputs from the mobile app. First, the translation table is created, which contains data in a plurality of fields or field index and a plurality of register destination addresses for a firmware event. In this case, the translation table might include fields for the current temperature set point, the new temperature set point, and the user input source (e.g., mobile app). Second, the firmware pushes data associated with the new temperature set point field to at least two different register destination addresses. For example, the new temperature set point data might be pushed to a register that controls the HVAC system and another register that communicates the new set point to the mobile app. Third, the translation table is recompiled with updated data pushed from the new temperature set point field to at least two different register destination addresses. The updated translation table now reflects the new temperature set point data in the two different registers. Finally, the firmware performs the function of updating the temperature set point in the HVAC system and communicating the new set point to the mobile app based on the translation table with updated data pushed from the new temperature set point field to the two different register destination addresses. This is accomplished solely by changing the translation table, which provides a flexible and efficient way to update the firmware functionality without having to modify the underlying code or bare-metal software.

In another example of a practical application of method 200, consider a military vehicle equipped with various sensors, such as cameras, radars, and LIDARs, that gather data about the vehicle's surroundings. The vehicle's firmware processes this data and sends commands to the vehicle's systems to perform tasks such as navigating, avoiding obstacles, and identifying targets. One critical function of the firmware in a military vehicle is to identify friendly and enemy vehicles in real-time to avoid friendly fire incidents. The firmware achieves this function by analyzing sensor data and comparing it to a database of known vehicle types. To implement the computer implemented method 200 described, consider a specific firmware function that involves updating the database of known vehicle types based on new sensor data. First, the translation table is created, which contains data in a plurality of fields or field index and a plurality of register destination addresses for a firmware event. In this case, the translation table might include fields for the vehicle type, the sensor data, and the database index. Second, the firmware pushes data associated with the new sensor data field to at least two different register destination addresses. For example, the new sensor data might be pushed to a register that analyzes the data and another register that stores the data in the database. Third, the translation table is recompiled with updated data pushed from the new sensor data field to at least two different register destination addresses. The updated translation table now reflects the new sensor data in the two different registers. Finally, the firmware performs the function of updating the database of known vehicle types based on the translation table with updated data pushed from the new sensor data field to the two different register destination addresses. This is accomplished solely by changing the translation table, which provides a flexible and efficient way to update the firmware functionality without having to modify the underlying code.

These two examples of practical applications of method 200 are meant to be just a couple of examples of the improved functionality of method 200 to solve the computer specific problems described herein. The method 200 can be applied to other technologies, either civilian or military.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone may be utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium including a non-transitory computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be a transitory computer readable storage medium that is transportable, like, carrier wave, such that the program or programs stored thereon can be loaded onto one or more different computers or other processors to implement various aspects of the present disclosure as discussed above The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments. As such, one aspect or embodiment of the present disclosure may be a computer program product including least one non-transitory computer readable storage medium in operative communication with a processor, the storage medium having instructions stored thereon that, when executed by the processor, implement a method or process described herein, wherein the instructions comprise the steps to perform the method(s) or process(es) detailed herein.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of components A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A computer implemented method comprising:
providing a translation table containing data in a plurality of fields and a plurality of register destination addresses for a firmware event;
pushing data associated with one field to at least two different register destination addresses;
recompiling the translation table with updated data pushed from the one field to the at least two different register destination addresses; and
performing a function in firmware based on the translation table with the updated data pushed from the one field to the at least the two different register destination addresses by solely changing the translation table.

2. The computer implemented method of claim 1, further comprising:
delimiting a one-to-one constraint of the translation table.

3. The computer implemented method of claim 1, further comprising:
performing the function in firmware based on the translation table with the updated data pushed from the one field to the at least the two different register destination addresses without changing bare-metal software.

4. The computer implemented method of claim 1, further comprising:
performing the function in firmware based on the translation table with the updated data pushed from the one field to the at least the two different register destination addresses without changing the one field.

5. The computer implemented method of claim 1, further comprising:
performing the function in firmware based on the translation table with the updated data pushed from the one field to the at least the two different register destination addresses without changing an event message.

6. The computer implemented method of claim 1, further comprising:
reordering the plurality of fields solely via bare-metal software.

7. The computer implemented method of claim 1, further comprising:
reordering the plurality of fields without altering the firmware.

8. The computer implemented method of claim 1, further comprising:
solely modifying the firmware when no additional new fields are needed in the firmware event.

9. The computer implemented method of claim 1, further comprising:
modifying the firmware when no additional new fields are needed in the firmware event without altering software.

10. The computer implemented method of claim 1, further comprising:
removing a row representing a field from the plurality of fields from the translation table solely within the translation table.

11. The computer implemented method of claim 1, further comprising:
removing a row representing a field from the plurality of fields from the translation table without altering the firmware or software.

12. The computer implemented method of claim 1, further comprising:
replicating a row representing a field from the plurality of fields in a field index from the translation table solely within the translation table.

13. The computer implemented method of claim 1, further comprising:
replicating a row representing a field from the plurality of fields in a field index from the translation table without altering the firmware or software.

14. The computer implemented method of claim 1, further comprising:
duplicating a row representing a field from the plurality of fields in a field index from the translation table solely within the translation table.

15. The computer implemented method of claim 1, further comprising:
duplicating a row representing a field from the plurality of fields in a field index from the translation table without altering the firmware or software.

16. A computer firmware product for improving computer processing efficiency, the computer firmware product operable with at least one non-transitory computer readable storage medium in operative communication with a computer processing unit (CPU), the storage medium having instructions stored thereon that, when executed by the CPU, implement a process to replicate at least one field index in multiple register destinations, the process comprising:
providing a translation table containing data in a plurality of fields and a plurality of register destination addresses for a firmware event;
pushing data associated with the one field to the at least two different register destination addresses;
recompiling the translation table with updated data pushed from one field to at least two different register destination addresses; and
performing a function in firmware based on the translation table with updated data pushed from the one field to the at least the two different register destination addresses by solely changing the translation table.

17. The computer firmware product of claim 16, further comprises:
delimiting a one-to-one constraint of the translation table; and
performing the function in firmware based on the translation table with updated data pushed from the one field to the at least the two different register destination addresses without changing software, without changing the one field, and without changing an event message.

18. The computer firmware product of claim 16, further comprises:
   replicating a row representing a field from the plurality of fields in a field index from the translation table solely within the translation table.

\* \* \* \* \*